(No Model.)
J. B. HOPPER.
PAINTER'S HOOK.
No. 383,883. Patented June 5, 1888.
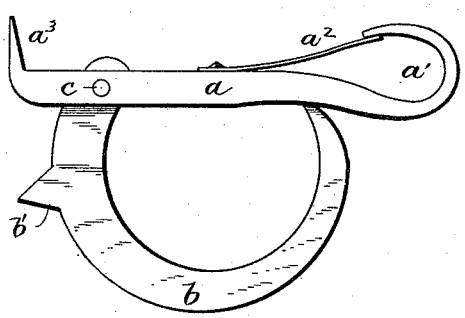
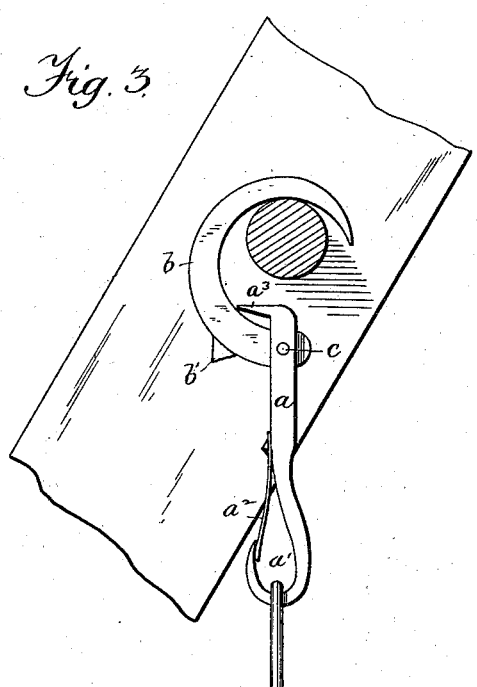
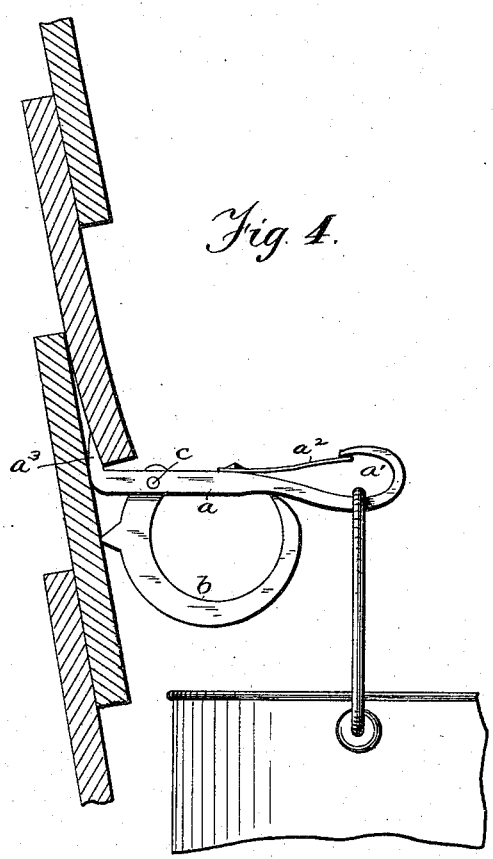
WITNESSES:
Wm. A. Rosenbaum
Frank C. Gratz
INVENTOR:
Joseph B. Hopper,
BY
W. J. Johnston,
ATTORNEY.

UNITED STATES PATENT OFFICE.

JOSEPH B. HOPPER, OF NEWARK, NEW JERSEY.

PAINTER'S HOOK.

SPECIFICATION forming part of Letters Patent No. 383,883, dated June 5, 1888.

Application filed March 27, 1888. Serial No. 268,689. (No model.)

*To all whom it may concern:*

Be it known that I, JOSEPH B. HOPPER, a citizen of the United States, residing at Newark, in the county of Essex and State of New Jersey, have invented certain new and useful Improvements in Painters' Hooks; and I do hereby declare that the following is a full, clear, and exact description of my invention, such as will enable others skilled in the art to which it appertains to make and use the same.

My invention pertains to a device for temporarily suspending buckets, pails, and similar articles at elevated positions or at places where it is inconvenient to hold them in the hand and perform other operations at the same time.

The device is particularly adapted for painters' uses; and it consists of two hooks pivoted together, one of which is adapted to hold up the bail of the bucket and the other to pass over the round of a ladder or other support for sustaining the device and the weight it carries.

The hooks are movable upon each other, and may be arranged or converted into a device for suspending the bucket from the side of a wall, the formation of claws on one of the hooks facilitating this performance.

Referring to the accompanying drawings, Figure 1 represents a side elevation of the device; Fig. 2, a plan; Fig. 3, the position of the device when attached to a ladder, and Fig. 4 a view of the device secured to the woodwork on the side of a building.

$a$ and $b$ represent the two main parts of the device. The part $a$ consists of an arm having a hook, $a'$, at one end, which receives the bail or handle of the vessel suspended. This hook may be combined with a spring, $a^2$, to form an ordinary snap-hook. This will prevent the device from falling off of the bail of the vessel when it is not in use. The spring, however, may be dispensed with, if desired.

Opposite the hook $a'$ on the arm $a$ are two claws, $a^3$, one on each side of a slot, $a^4$. The purpose of the claws will be described later on. The part $b$ consists of a circular arm or hook, which is pivoted at $c$ to the arm $a$, and plays in the slot $a^4$. $b$ is armed with a brad or pointed lug, $b'$, for a purpose to be set forth.

In Fig. 3 I have shown the hook $b$ caught over the round of a ladder, and the hook $a'$ carrying the bail of a bucket. This is the ordinary position of the device when suspended over a bar, beam, limb of a tree, or other like support.

In Fig. 4 I have shown the device attached to the clapboards or weather-boards on the side of a building. The claws $a^3$ $a^3$ are caught under the lower edge of a clapboard. The bail of the bucket is placed over the hook $a'$, and the added weight then forces the lug $b'$ against the wall, thus pressing the device and holding all in position. The point of the hook $b$ rests against the under side of the arm $a$.

It will be understood, of course, that the claws $a^3$ may be caught under any kind of a projection which will sustain and give position to the device.

In use, painters will find it convenient, when moving their ladder from one position to another, to suspend the bucket in the manner shown in Fig. 4 until they have readjusted their ladder. They can then go up and move it to any other convenient position they choose. The device, however, is not confined to painters' uses alone, as it will be found useful in the household in many different instances. The hook may be used to suspend a bucket on the outside of a house while washing windows, or it may hold a bird-cage.

Having now described my invention, what I claim is—

1. A device for suspending articles, consisting of an arm provided with a hook at one end and claws or toes on the other end, in combination with an arm pivoted to it and adapted to serve as a brace between the supporting-body and the first-mentioned arm by resting against the said body and arm, substantially as described.

2. The arm $a$, provided with hook $a'$ and claws $a^3$, in combination with arm $b$, provided with lug $b'$.

In witness whereof I have hereunto signed my name in the presence of two subscribing witnesses.

JOSEPH B. HOPPER.

Witnesses:
E. R. PRICE,
H. R. CARSTAKE.